INVENTOR.
LAFAYETTE B. SMITH
BY
Charles L. Lovercheck
ATTORNEY

June 7, 1960　　　　　　L. B. SMITH　　　　　2,939,349
PRESS AND FEED MECHANISM FOR MAKING ANODE BALLS
Filed Jan. 14, 1957　　　　　　　　　　　　5 Sheets-Sheet 3

INVENTOR.
LAFAYETTE B. SMITH
BY
*Charles L. Lovercheck*
ATTORNEY

June 7, 1960

L. B. SMITH 2,939,349

PRESS AND FEED MECHANISM FOR MAKING ANODE BALLS

Filed Jan. 14, 1957

INVENTOR.
LAFAYETTE B. SMITH

BY

*Charles H. Hounshell*

ATTORNEY

June 7, 1960 L. B. SMITH 2,939,349
PRESS AND FEED MECHANISM FOR MAKING ANODE BALLS
Filed Jan. 14, 1957 5 Sheets-Sheet 5
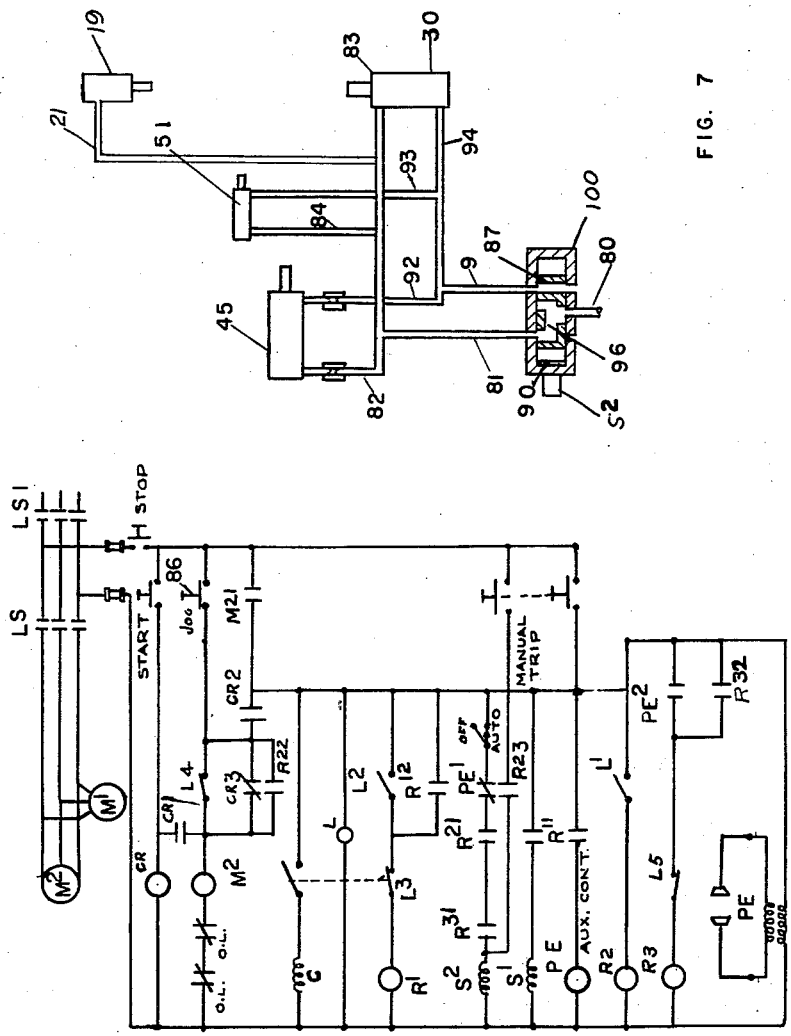
INVENTOR
LAFAYETTE B. SMITH
BY
Charles L. Lauercheck
ATTORNEY United States Patent Office 2,939,349
Patented June 7, 1960

2,939,349
PRESS AND FEED MECHANISM FOR MAKING ANODE BALLS

Lafayette B. Smith, North East Township, Erie County, Pa., assignor to The Electric Materials Co., North East Borough, Erie County, Pa., a corporation of Pennsylvania Filed Jan. 14, 1957, Ser. No. 634,058

1 Claim. (Cl. 78—99)

This invention relates to presses and, more particularly, to presses for forming metal into the shape of a sphere.

In forming anode balls for use in electroplating processes, there has been a need for a simple efficient machine for rapidly and automatically feeding slugs into a machine for forming the slugs into spheres and for ejecting the formed spheres from the machine. Previous machines for performing this function have been either intricate and expensive or have required considerable attention by an operator in order to insure reliable and accurate results.

It is, accordingly, an object of this invention to overcome the defects and disadvantages in prior machines and, more particularly, it is an object of this invention to provide a machine for automatically forming anode balls which is simple in construction, economical to manufacture, and simple and efficient in operation.

Another object of the invention is to provide a machine for feeding anode balls wherein a quantity of raw material can be deposited in a hopper and each unit of the material can be fed into the machine automatically and continuously without interruption.

A further object of the invention is to provide an improved machine for automatically feeding material into a press.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 6 is a wiring diagram of the electrical controls for the machine;

Fig. 7 is a diagram of the piping of the machine; and

Fig. 8 is a top view of the machine showing the cams and switches.

Figure 1:
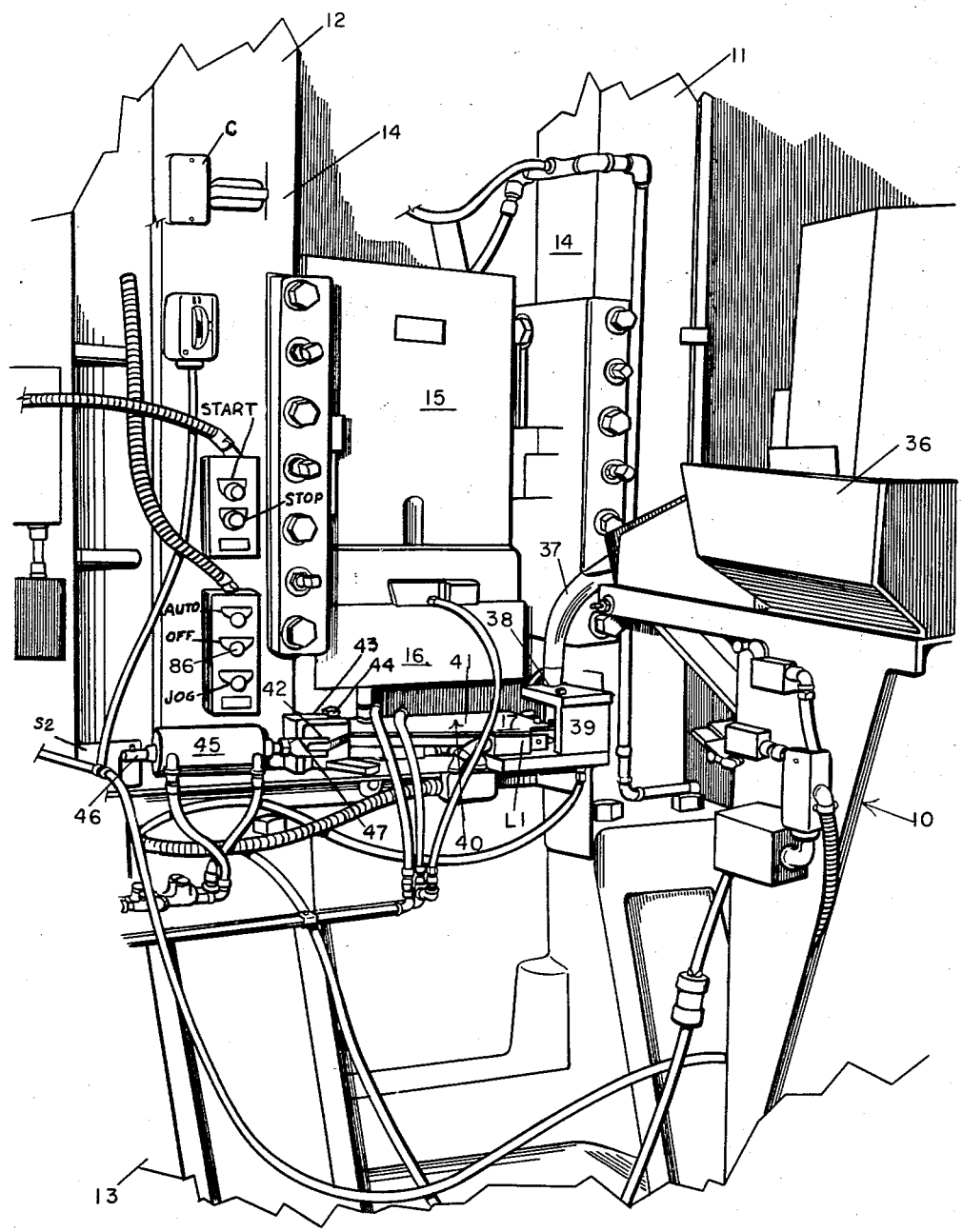
Fig. 1 is an isometric view of a machine according to the invention.
Figure 2:
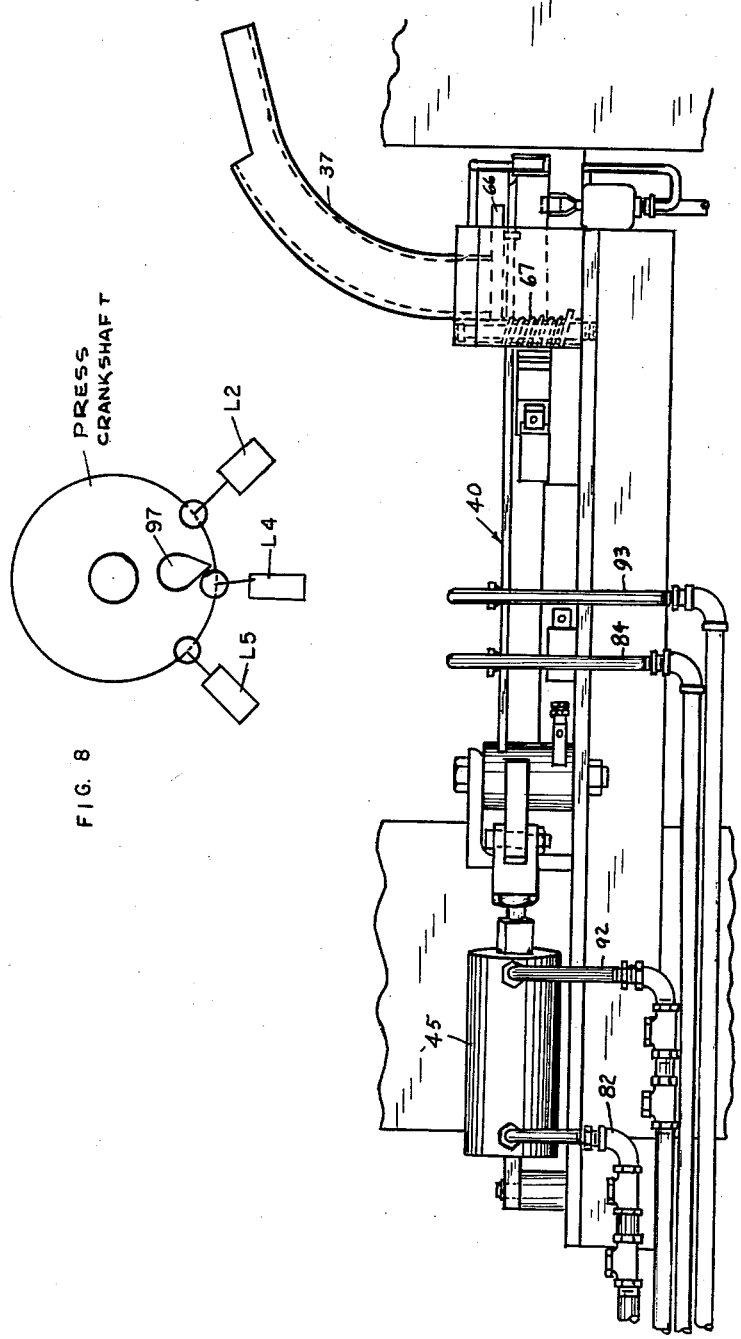
Fig. 2 is an enlarged view of the feeding mechanism of the machine.

Now with more specific reference to the drawings, a press 10 is shown having guides 11 and 12 fixed to a base 13 and having guideways 14 thereon for guiding a ram 15 up and down. An upper die 16 of a die set is fixed to the ram 15 and a lower die 17 of the die set is fixed to the base 13. The two portions 16 and 17 of the die set each have a hemispherical cavity 18 in which anode balls are formed.

Figure 5:
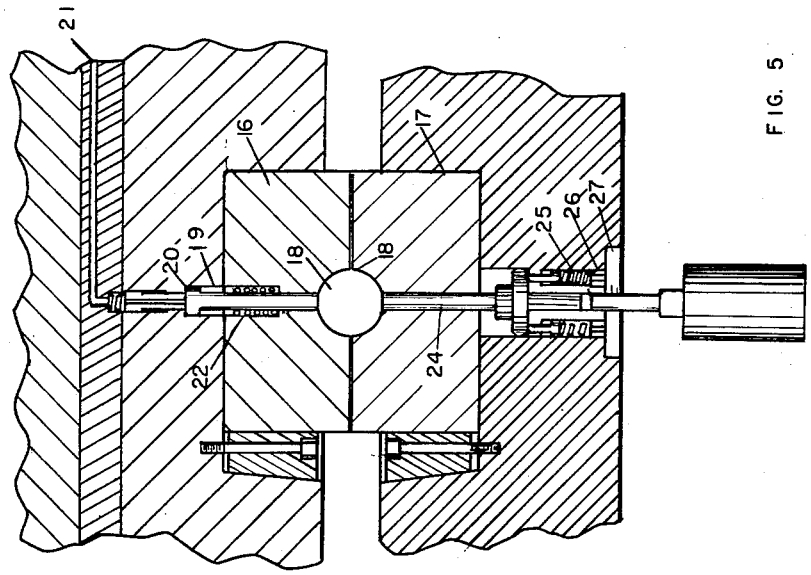
Fig. 5 is a view of the machine with the ram down and the slug formed.

The top section 16 has a cylindrical bore 19 therein in which a hold-down piston 20 operates when pushed by air from a pipe 21 to push the hold-down pin against the ball to push the ball out of the upper section 16 of the die. A return spring 22 urges the hold-down piston 20 to the position shown in Fig. 5. The bottom section 17 of the die has a knock-out pin 24 slidable therein and actuated by springs 25 which are supported on fixed members 26 which are in turn supported on a plate 27.

Figure 4:
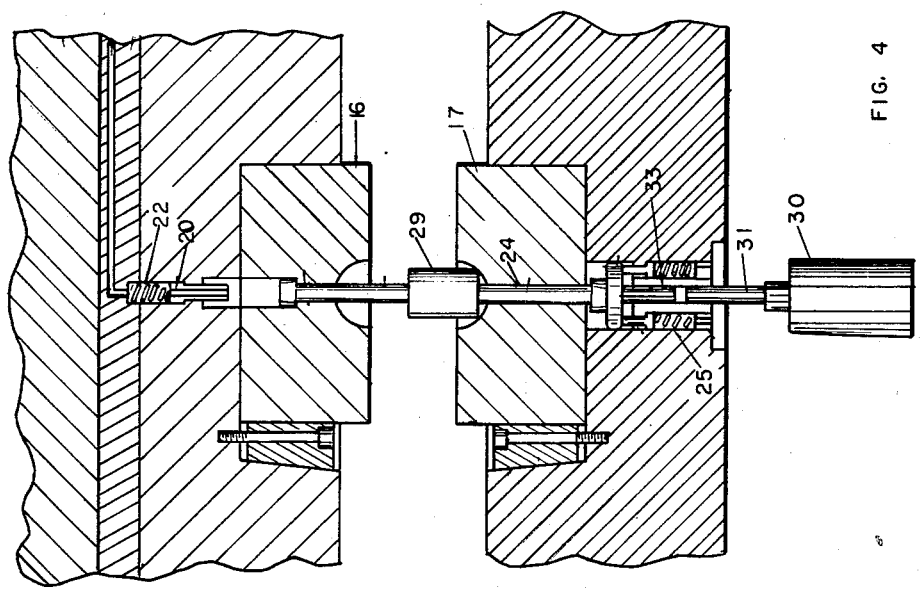
Fig. 4 is a cross sectional view of the machine with a slug in place ready to be pressed.

When the ram 15 is up, the knock-out pin 24 is in the position shown in Fig. 4 urged to that position by the springs 25. When the ram 15 is down and the ball 18 has been formed from a slug 29, the knock-out pin 24 will be in the position shown in Fig. 5. A knock-out cylinder 30 has a piston therein which is connected to a piston rod 31 which in turn engages a bottom end 33 of the pin 24, therefore aiding the springs 25 in knocking the part out of the die when the ball has been completed.

The slugs 29 which are cylindrical in shape and of fixed weight are stored in a hopper 36. The hopper 36 communicates with the die through a chute 37. A lower end 38 of the chute 37 is attached to a fixed block 39 and discharges through an opening at the point of juncture therewith.

The feeding mechanism is made up of a feed arm 40 which is in the form of a bell crank having an arm 41 integrally attached to an arm 42 and pivoted to a bracket 43 on the fixed frame at 44. A feed arm cylinder 45 is pivotally mounted to the fixed frame at 46 and the piston therein is connected to a piston rod 47 which is in turn pivoted to the arm 42 at 48. A clamping cylinder 51 is swingably connected to a bracket 52 at 53. The bracket 52 is integrally connected to the feed arm 40. A piston rod 55 of the clamping cylinder 51 is attached at one end to the piston in the cylinder 51 and is pivotally attached to a clamping lever 58 at the other end. The lever 58 is swingably connected to a jaw 59 at 60 and is pivotally connected at 61 to the piston rod 55. The jaw 59 is in turn integrally connected to the feed arm 40. The feed arm 40 extends further and terminates at an end 63 with a fixed jaw 64 integrally connected thereto.

The swinging jaw 59 and the fixed jaw 64, being spaced from each other, form a slug clamping space therebetween. A feed plate 66 is swingably connected to the block 39 at 68 and is spring urged to a position under the chute 37 by a spring 67. A top surface 70 of the press frame inclines toward a discharge tube 72 and walls 71 converge on the discharge tube 72 so that the ball rolls down the inclined surface 70 into the discharge tube 72 past an oil spray 73 which sprays oil on the balls to cleanse and oil them. The balls then roll on down into a shipping crate 74 for final disposal.

It will be noted that the balls roll between a photocell 75 and a light source 76. This interlocks the machine so that it will not operate until the ball has rolled out of the machine, thereby preventing damage to the machine and to the balls by preventing the ram 15 from coming down on a ball before it escapes. An electric eye 77 and a light source 78 are provided in order to insure that the slug is properly positioned before the machine will operate. If the slug is not between these two elements; that is, the light source 76 and the photocell 75, the machine will be prevented from operating.

The piping for the machine is shown in Fig. 7. $S^2$ is a solenoid of a valve 100. When the solenoid $S^2$ is energized, it moves a plunger 90 of the valve 100 to the position shown in Fig. 7. This will swing the arm 40 to carry a slug in, cause the cylinder 19 to clamp the slug, and cause the cylinder 51 to grip the slug. When the solenoid $S^2$ is deenergized, it moves the plunger 90 to a position where the plunger 90 will align with a pipe 81 and a port 96 will align with a pipe 9, thereby applying air in front of the piston in the cylinder 45 to swing the arm 40 out from under the press ram 15 to release the slug and applying air behind the piston in the cylinder 51 and applying air behind the pistons in the cylinders 19 and 30.

contact $R^{11}$ will open and since relay contact $R^{12}$ opens, solenoid $R^1$ will remain deenergized. Also, since $S^1$ is energized, the press ram 15 will descend. The ram crank will rotate the cam 97 with it and close in the order $L^5$, $L^2$, and $L^4$.

To facilitate an understanding of the operation of the press 10, the following table is provided:

*Automatic position*

To start operation: Break PE beam

| FEEDER | RAM (CRANK) | | RAM (CRANK) |
|---|---|---|---|
| Back $L^1$, CL, R2 energizes | Up → PE fires R3, $S^2$ energized | | Down → Trips ram $L^4$ held $L^2$ and L5 trips R3 deenergized |
| Feeds ← $L^3$ tripped $R^1$ and $S^1$ deenergized | | Energizes ← $R^1$ and $S^1$ | |
| | | → Feeder returns $L^1$ and CL, R2 and $S^2$ energized | |
| | R3 energized, etc. | | Ball ejected Breaks PE beam |

NOTE.—$L^4$ and $R^2$ alternate in holding $M^1$ interlock closed. This prevents the ram 15 from descending on the feeder arm 40.

The electrical wiring diagram is shown in Fig. 6 wherein $M^1$ represents a press motor for driving the ram 15 of the press 10 and $M^2$ is an oil pump motor for supplying oil thereto. These motors run continuously when switches LS and $LS^1$ are closed. The following switches are used in the circuit:

$L^1$—Arm limit switch (closed when the feeder arm is back)

$L^2$—Crank operating switch (tripped when the press arm moves up)

$L^3$—Arm return trip switch $L^4$—Crank operating switch (closed when the ram is up)

$L^5$—Crank operating switch (ram trip delay)

Fig. 8 shows the switches $L^2$, $L^4$, and $L^5$ supported on the press frame and the press crank shaft having a cam 97 mounted thereon. The cam 97 is shown in the position it occupies when the ram 15 is entirely up. In this position, it holds the switch $L^4$ open. When the ram starts down, it trips the switch $L^5$ and the ram 15 trips the switch $L^2$ just before coming to rest at the end of its cycle. Relays $R^1$, CR, $R^2$, and $R^3$ are located in convenient fixed positions on the press 10.

To operate the press 10 manually, it is merely necessary to provide a supply of slugs in the hopper 36 which will be held back by the feed plate 66 and to turn on the line switches LS and $LS^1$ to cause the motors $M^1$ and $M^2$ to operate. When the arm 40 is back to the position shown in Fig. 3, it will be engaging the switch $L^1$, holding it closed. Therefore, relay $R^2$ will be energized and $R^{21}$, $R^{22}$, and $R^{23}$ will be closed. Then the operator may actuate the manual trip switch which will close it and since $R^{23}$ is closed, the solenoid $S^2$ will be energized and the press cycle described above will be initiated.

Air will flow through pipes 81, 82, and 84 to cause the jaw 59 to clamp the slug and the arm 40 to swing inwardly to carry a slug from the hopper 36 to position in the die 17. The piston in the cylinder 19 will then be forced down to clamp the slug 29 as shown in Fig. 4. As the arm 40 swings in and strikes the limit switch $L^3$, the switch $L^3$ will open to solenoid $R^1$ and this will cause the solenoid $R^1$ to be deenergized, opening $R^{11}$ and $R^{12}$. Since the arm 40 has moved off of the switch $L^1$, it will be open and $R^2$ will deenergize, opening $R^{21}$, $R^{22}$, and $R^{23}$. Solenoid $S^2$ will also be deenergized since relay When it is desired to operate the press 10 automatically, a supply of slugs 29 will again be deposited in the hopper 36 and they will be held from falling down from the chute 37 by the plate 66. Again, LS and $LS^1$ will be closed to start the motors $M^1$ and $M^2$. Since the feed arm 40 is back, the switch $L^1$ will be closed and $R^2$ will therefore be energized. $R^{21}$, $R^{22}$, and $R^{23}$ will be closed. Then when the operator presses the start button, relay CR will be energized and contacts $CR^1$ and $CR^2$ will close and $CR^3$ will open. Therefore, the relay solenoid $M^2$ will be energized and contact $M^{21}$ will close. The operator may then either trip the manual trip switch to start the operation or intercept the light beam between the light source 76 and the photoelectric cell 75. This will close $PE^2$ and energize solenoid $R^3$ which will interlock itself through contact $R^{32}$ and energize solenoid $S^2$ through contact $R^{23}$. This will actuate the solenoid $S^2$ and cause the piston in the cylinder 51 to clamp the slug between the movable jaw 59 and the fixed jaw 64 with the axis of the slug in vertical position. The piston in the cylinder 45 will be energized, swinging the arm 40 in to bring the slug into a position above the die. The clamping cylinder 19 will then clamp the slug in place as shown in Fig. 4.

Figure 3:
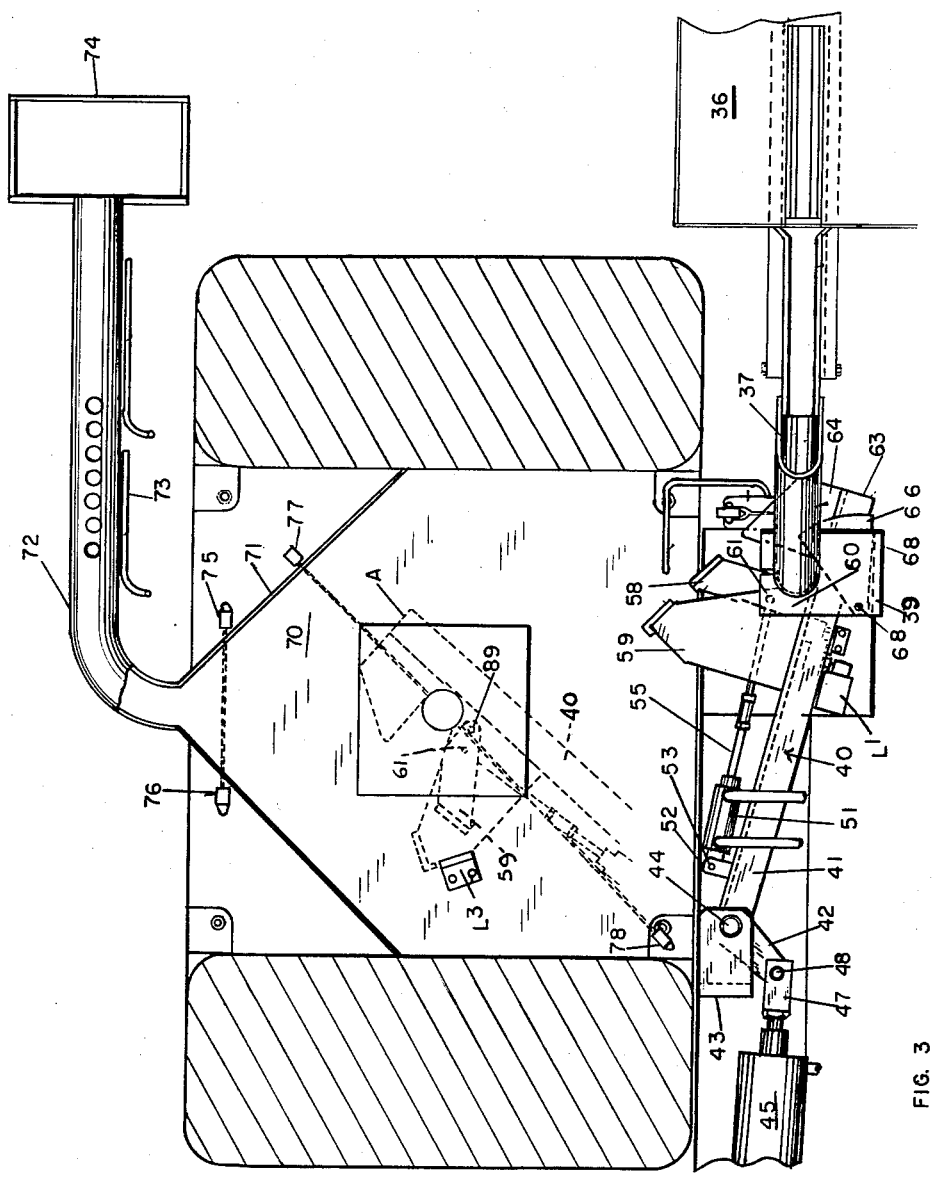
Fig. 3 is an enlarged top view of the feeding mechanism of the machine.

When the arm 40 swings to the position shown by dotted lines in Fig. 3, the switch $L^3$ will be opened. This will deenergize relay $R^1$ which will open relay $R^{11}$. As soon as the arm 40 moves, switch $L^1$ will open, deenergizing $R^2$ and thereby opening $R^{21}$ and $R^{23}$ which will deenergize $S^2$, causing the arm 40 to return to its original position. In the meantime, $R^{11}$ will have energized solenoid $S^1$ which is the ram solenoid and the ram 15 will come down and press the ball and return to its up stroke. As the ram crank rotates, it will open in turn switch $L^5$ and deenergize the relay $R^3$, opening the contacts $R^{32}$ and $R^{31}$. When the contact $R^{31}$ opens, the solenoid valve $S^2$ will be deenergized and the arm 40 will swing out from under the ram 15 as the ram 15 makes its initial movement opening switch $L^5$. As the ram 15 continues to move, the cam 97 thereon will close the switch $L^2$ again, energizing $R^{11}$ so that its contacts $R^{11}$ and $R^{12}$ will be closed for the next stroke. As the ball intercepts the light beam between the photocell PE, the contact $PE^2$ will be momentarily closed and relay $R^3$ will again be picked up and it will lock itself in through contact $R^{32}$ and, therefore, contact R³¹ will be held closed so that on the next cycle when R²¹ is closed, the solenoid valve S² will again operate.

This cycle continues each time a ball is discharged from the die and intercepts the light beam from the source 75 on photocell PE. The photocell PE will close contact PE² and open contact PE¹ momentarily, thus causing the cycle to repeat and the balls to continue to be formed from the slugs 29 from the hopper 36. The electric eye 77 and light source 78 are provided to insure that the press ram 15 does not operate before the ball is discharged from the die.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

A press for forming anode balls comprising a ram and a platen, said platen and said ram each having a die thereon having complementary hemispherical cavities therein, a swinging arm swingably connected to said platen and one end thereof having an outwardly extending fixed jaw, a swingable jaw swingably connected to said arm adjacent said fixed jaw, an air cylinder connected to said swinging arm and said swinging jaw, a holddown pin extending axially through said hemispherical cavity in one said die, a source of compressed air connected to said cylinders when said arm is swung to a position under a slug feeding mechanism, said slug feeding mechanism comprising a hopper supported on said press and a tubular track communicating therefrom and to said swinging arm, a photoelectric cell disposed on one side of said die, a source of light supported on said press on the other side of said die projecting a beam of light on said photoelectric cell across said cavity in said die, said light beam being interrupted by a slug when in position in said die, said photoelectric cell interrupting the circuit controlling said press ram, preventing said press ram from descending when a slug is not in position in said die, and a discharge path on said platen to said die, said discharge path having a photoelectric cell disposed on one side thereof and a light source on the other side projected on said photoelectric cell, said photoelectric cell on said platen interrupting said press ram when an anode ball lies therebetween interrupting said beam.

References Cited in the file of this patent
UNITED STATES PATENTS

| | | |
|---|---|---|
| 230,638 | King | Aug. 3, 1880 |
| 488,389 | Devine | Dec. 20, 1892 |
| 668,665 | Veeder | Feb. 26, 1901 |
| 911,911 | Sisson | Feb. 9, 1909 |
| 912,194 | Smith | Feb. 9, 1909 |
| 1,211,611 | Meyer et al. | Jan. 9, 1917 |
| 1,847,631 | Soss | Mar. 1, 1932 |
| 1,857,997 | Brennan | May 10, 1932 |
| 2,070,737 | Kahan | Feb. 16, 1937 |
| 2,314,123 | Butterfield | Mar. 16, 1943 |
| 2,470,102 | Kruse et al. | May 17, 1949 |
| 2,571,594 | McKinsey | Oct. 16, 1951 |
| 2,575,504 | Wright | Nov. 20, 1951 |
| 2,589,475 | Carlsen et al. | Mar. 18, 1952 |
| 2,609,776 | Sahlin | Sept. 9, 1952 |
| 2,750,819 | Gapstur | June 19, 1956 |